US012315311B2

(12) United States Patent
Cozza

(10) Patent No.: US 12,315,311 B2
(45) Date of Patent: May 27, 2025

(54) SYSTEMS AND METHODS FOR MONITORING IMPLEMENT PERFORMANCE DURING AN AGRICULTURAL OPERATION

(71) Applicant: CNH Industrial America LLC, New Holland, PA (US)

(72) Inventor: Michael R. Cozza, Pittsburgh, PA (US)

(73) Assignee: CNH Industrial America LLC, New Holland, PA (US)

( * ) Notice: Subject to any disclaimer, the term of this patent is extended or adjusted under 35 U.S.C. 154(b) by 261 days.

(21) Appl. No.: 18/072,404

(22) Filed: Nov. 30, 2022

(65) Prior Publication Data

US 2024/0177538 A1 May 30, 2024

(51) Int. Cl.
*G07C 5/08* (2006.01)
*A01B 63/111* (2006.01)
*A01B 63/114* (2006.01)
*A01B 69/00* (2006.01)

(52) U.S. Cl.
CPC ........ *G07C 5/0808* (2013.01); *A01B 63/1112* (2013.01); *A01B 63/114* (2013.01); *A01B 69/004* (2013.01); *G07C 5/0825* (2013.01)

(58) Field of Classification Search
CPC . G07C 5/0808; A01B 63/1112; A01B 63/114; A01B 69/004
See application file for complete search history.

(56) References Cited

U.S. PATENT DOCUMENTS

| 4,935,700 A | 6/1990 | Garbini et al. |
| 5,044,756 A | 9/1991 | Gaultney et al. |
| 5,278,423 A | 1/1994 | Wangler et al. |

(Continued)

FOREIGN PATENT DOCUMENTS

| CN | 1447116 | 10/2003 | |
| CN | 103323160 | * 3/2012 | ............... G01L 5/00 |

(Continued)

OTHER PUBLICATIONS

Ted M. Zobek "Soil Surface Roughness Measurement" USDA, Agricultural Research Service, Lubbock, TX Published 1990 (3 Pages).

(Continued)

*Primary Examiner* — Hongmin Fan
(74) *Attorney, Agent, or Firm* — Rebecca Henkel; Peter K. Zacharias; Rickard K. DeMille

(57) ABSTRACT

A method for monitoring the operating performance of agricultural implements includes moving an agricultural implement in a direction of travel along a first swath of a field, and receiving data associated with a field profile of an aft portion of the field located rearward of the agricultural implement relative to the direction of travel as the implement is being moved along the first swath, with the aft portion including both the first swath and a second swath of the field located adjacent the first swath. The method also includes determining one or more profile parameters associated with the first swath and the second swath based at least in part on the data, and comparing the one or more profile parameters for the first swath to the one or more profile parameters for the second swath to assess an operating performance of the agricultural implement within the field.

20 Claims, 4 Drawing Sheets

(56) References Cited

U.S. PATENT DOCUMENTS

| | | | |
|---|---|---|---|
| 5,412,219 A | 5/1995 | Chappelle et al. | |
| 6,222,628 B1 | 4/2001 | Corallo et al. | |
| 6,608,672 B1 | 8/2003 | Shibusawa et al. | |
| 6,853,937 B2 | 2/2005 | Shibusawa et al. | |
| 6,919,959 B2 | 7/2005 | Masten | |
| 7,068,816 B1 | 6/2006 | Knoblauch et al. | |
| 7,092,106 B2 | 8/2006 | Cox et al. | |
| 7,748,264 B2 | 7/2010 | Prem | |
| 8,179,533 B2 | 5/2012 | Alameh | |
| 8,451,449 B2 | 5/2013 | Holland | |
| 8,463,510 B2 | 6/2013 | Knapp | |
| 8,755,049 B2 | 6/2014 | Holland | |
| 8,862,339 B2 | 10/2014 | Henry et al. | |
| 8,958,603 B2 | 2/2015 | Boriah et al. | |
| 9,026,321 B2 | 5/2015 | Henry et al. | |
| 9,030,549 B2 | 5/2015 | Redden | |
| 9,050,725 B2 | 6/2015 | Shull | |
| 9,058,560 B2 | 6/2015 | Johnson | |
| 9,107,344 B2 | 8/2015 | Madsen et al. | |
| 9,131,642 B2 | 9/2015 | Groeneveld | |
| 9,147,110 B2 | 9/2015 | Anderson et al. | |
| 9,148,995 B2 | 10/2015 | Hrnicek et al. | |
| 9,282,688 B2 | 3/2016 | Casper et al. | |
| 9,428,885 B2 | 8/2016 | Nau | |
| 11,266,054 B2 | 3/2022 | Ferrari et al. | |
| 2002/0090132 A1 | 7/2002 | Boncyk et al. | |
| 2007/0039745 A1 | 2/2007 | Anderson et al. | |
| 2014/0347448 A1 | 11/2014 | Hegemann et al. | |
| 2015/0268218 A1 | 9/2015 | Troxler | |
| 2015/0305228 A1 | 10/2015 | Zemenchik | |
| 2015/0354943 A1 | 12/2015 | Posselius et al. | |
| 2016/0029547 A1 | 2/2016 | Casper et al. | |
| 2016/0084813 A1 | 3/2016 | Anderson et al. | |
| 2016/0134844 A1 | 5/2016 | Casper et al. | |
| 2017/0112043 A1 | 4/2017 | Nair et al. | |
| 2018/0027179 A1 | 1/2018 | Matsuzaki et al. | |
| 2018/0206393 A1 | 7/2018 | Stoller et al. | |
| 2019/0073534 A1 | 3/2019 | Dvir | |
| 2020/0352088 A1* | 11/2020 | Arnett | A01B 49/027 |
| 2021/0127545 A1* | 5/2021 | Foster | A01B 63/008 |
| 2023/0389458 A1* | 12/2023 | Ekhe | G05D 1/0274 |

FOREIGN PATENT DOCUMENTS

| | | |
|---|---|---|
| WO | WO 2009/153304 | 12/2009 |
| WO | WO 2012/029026 | 3/2012 |
| WO | WO 2016/025848 | 2/2016 |
| WO | WO 2016/110832 | 7/2016 |
| WO | WO 2017/049186 | 3/2017 |

OTHER PUBLICATIONS

M.W.J. Davidson et al. "On the Characterization of Agricultural Soil Roughness for Radar Remote Sensing Studies" IEE Transactions on Geoscience and Remote Sensing, vol. 38, Issue 2 Published Aug. 6, 2002 (3 Pages).

W. Skierucha et al. "Application of smart sensors in the measurement of soil physical parameters" Institute of Agrophysics, Polish Academy of Sciences, Lublin, Poland Published 2004 (6 Pages).

M.M. Rahman et al. "Mapping surface roughness and soil moisture using multi-angle radar imagery without ancillary data" Science Direct / Remote Sensing of Environment 112 (2008) 391-402 Elsevier Inc. (12 Pages).

L.M. Thomsen et al. "Soil surface roughness: comparing old and new measuring methods and application in a soil erosion model" Soil, 1, 399-410, 2015 Published Apr. 24, 2015 (12 Pages).

Elbert C. Dickey et al. "Determining crop residue cover with electronic image analysis" Biological Systems Engineering Papers and Publications Paper 238 University of Nebraska—Lincoln Dated Jan. 1, 1989 (10 pages).

C.S.T. Daughtry et al. "Estimating Crop Residue Cover by Blue Fluorescence Imaging" Remote Sens. Environ. 60:14-21 (1997) Elsevier Science Inc. New York, NY (8 pages).

\* cited by examiner

SYSTEMS AND METHODS FOR MONITORING IMPLEMENT PERFORMANCE DURING AN AGRICULTURAL OPERATION

FIELD OF THE INVENTION

The present subject matter relates generally to agricultural implements and, more particularly, to systems and methods for monitoring the performance of an agricultural implement during an agricultural operation.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, it is important for the implement to be properly leveled such that the ground-engaging tools evenly engage the ground. When the implement becomes out-of-level relative to the ground, the field may be worked unevenly, which may affect the quality of subsequent agricultural operations within the field. Additionally, implement hop or bounce can result in an uneven field. As such, an operator must continuously monitor the performance of the implement during the tillage operation. However, it is often difficult for the operator to visually assess the performance of the implement, which means that the quality of the agricultural operation may be affected for long periods of operation. Further, manually adjusting one or more operating parameters of the implement is time consuming and, in some cases, needs to be repeated multiple times throughout a working operation of the implement.

Accordingly, improved systems and methods for monitoring the performance of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for monitoring the operating performance of agricultural implements. The method includes moving an agricultural implement in a direction of travel along a first swath of a field to perform an agricultural operation within the first swath of the field. The method also includes receiving, with a computing device, data associated with a field profile of an aft portion of the field located rearward of the agricultural implement relative to the direction of travel as the agricultural implement is being moved along the first swath, the aft portion comprising both the first swath and a second swath of the field located adjacent the first swath within the field. In addition, the method includes determining, with the computing device, one or more profile parameters associated with the first swath and the second swath based at least in part on the data, and comparing, with the computing device, the one or more profile parameters for the first swath to the one or more profile parameters for the second swath to assess an operating performance of the agricultural implement within the field.

In another aspect, the present subject matter is directed to a system for monitoring the operating performance of agricultural implements. The system includes an agricultural implement including a plurality of ground-engaging tools, and at least one field profile sensor supported relative to the agricultural implement. The field profile sensor(s) is configured to generate data associated with a field profile of an aft portion of the field located rearward of the agricultural implement relative to a direction of travel of the agricultural implement. The system also includes a controller communicatively coupled to the field profile sensor. The controller is configured to receive the data from the field profile sensor(s) as the agricultural implement is being moved along a first swath of the field during the performance of an agricultural operation, the aft portion comprising both the first swath and a second swath of the field located adjacent the first swath within the field. In addition, the controller is configured to determine one or more profile parameters associated with the first swath and the second swath based at least in part on the data, and compare the one or more profile parameters for the first swath to the one or more profile parameters for the second swath to assess an operating performance of the agricultural implement within the field.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
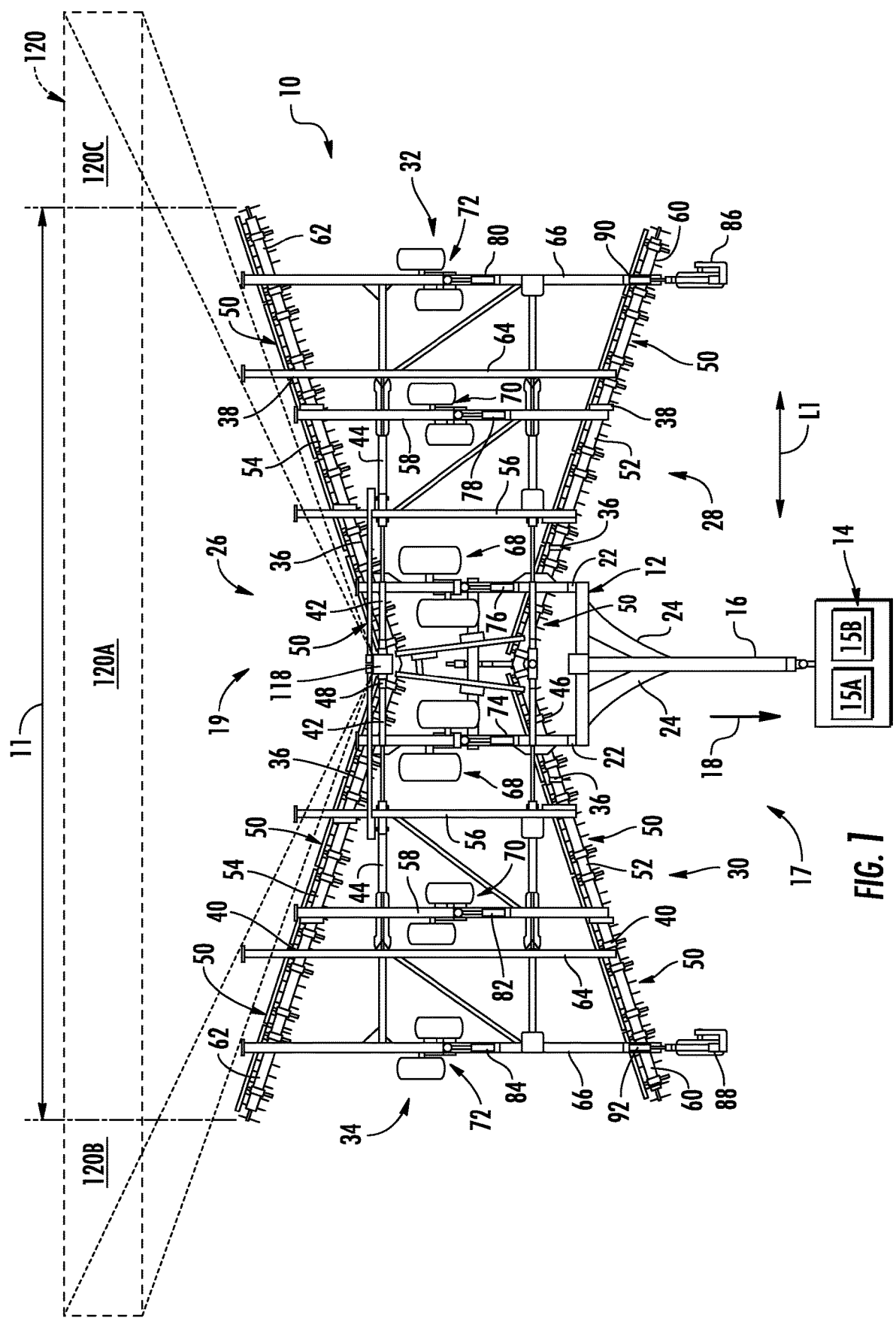
FIG. 1 illustrates a top view of one embodiment of an agricultural implement in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for monitoring the operating performance of an agricultural implement. In several embodiments, the disclosed system may monitor the field profile of the field behind the implement as an agricultural operation is being performed to assess the operating performance of the implement 10. For instance, in accordance with aspects of the present subject matter, one or more field profile sensors may be provided in association with the implement, with the field profile sensor(s) being configured to capture data associated with the field profile rearward of the implement. In doing so, the field profile sensor(s) may capture not only data associated with the field profile of the swath of the field currently being worked by the implement, but also data associated with the field profile of an adjacent swath of the field. For instance, the field profile sensor(s) may have a field of view spanning across two or more adjacent swaths of the field, thereby allowing the sensor(s) to capture field profile data associated with both the current swath and the adjacent swath.

The data captured by the field profile sensor(s) may then be analyzed by a controller of the disclosed system to assess the performance of the implement. For instance, in one embodiment, the field profile data may be used to calculate or determine one or more profile parameters associated with the current swath and the adjacent swath, such as by using the data to determine an average height and/or a roll orientation for each of the adjacent swaths. The monitored profile parameter(s) for the swath currently being worked may then be compared to the corresponding profile parameter(s) for the adjacent swath to assess the performance of the implement.

Additionally, in some embodiments, the controller may further be configured to automatically initiate a control action in response to determining the operating performance of the implement. For instance, in one embodiment, the control action may include providing an operator notification or adjusting the operation of one or both of the implement and/or the work vehicle towing the implement (e.g., stopping operation of the vehicle/implement). As an example, the comparison of the monitored profile parameters for the adjacent swaths may indicate that the implement is currently out-of-level. In such instance, the controller may be configured to automatically initiate a control action to adjust the levelness of the implement.

Referring now to FIG. 1, a top view of one embodiment of an agricultural implement 10 is illustrated in accordance with aspects of the present subject matter. As shown, the implement 10 is configured as a multi-wing disk ripper. However, in other embodiments, the implement 10 may have any other suitable implement configuration, such as by being configured as any other suitable tillage implement (e.g., a cultivator) or other implement (e.g., a planter, seeder, and/or the like).

As shown, the implement 10 includes a carriage frame assembly 12 configured to be towed by a work vehicle 14 (shown schematically in FIG. 1), such as a tractor. The carriage frame assembly 12 may generally extend between a forward end 17 and an aft end 19 along a forward direction of travel 18 of the implement and may include a pull hitch 16 extending in the direction of travel 18 of the implement 10 at the forward end 17 of the implement 10 and carrier frame members 22 which are coupled with and extend from the pull hitch 18. Reinforcing gusset plates 24 may be used to strengthen the connection between the pull hitch 18 and the carrier frame members 22. As shown schematically in FIG. 1, the work vehicle 14 may include an engine 15A and a transmission 15B. The transmission 15B may be operably coupled to the engine 15A and may provide variably adjusted gear ratios for transferring engine power to wheels or track assemblies (not shown) of the work vehicle 14 via a drive axle assembly (not shown) (or via axles if multiple drive axles are employed) for driving the work vehicle 14.

As shown in FIG. 1, the implement 10 is configured as a multi-section implement including a plurality of frame sections spanning across the implement's lateral width in a lateral direction L1 of the implement 10. Specifically, in the illustrated embodiment, the implement 10 includes a central frame section 26, inner right and left wing frame sections 28, 30 pivotally coupled to the central frame section 26, and right and left outer-wing sections 32, 34 pivotally coupled to the respective right and left inner-wing sections 28, 30. For example, each of the inner-wing sections 28, 30 is pivotally coupled to the central frame section 26 at pivot joints 36. Similarly, the right outer-wing section 32 is pivotally coupled to the right inner-wing section 28 at pivot joints 38 while the left outer-wing section 34 is pivotally coupled to the left inner-wing section 30 at pivot joints 40. As is generally understood, the pivot joints 36, 38, 40 may be configured to allow relative pivotal motion between adjacent frame sections of the implement 10. For example, the pivot joints 36, 38, 40 may allow for articulation of the various frame sections between a fully-extended position, in which the frame sections are all intended to be disposed substantially in a common plane, and a transport position, in which the wing sections 28, 30, 32, 34 are folded upwardly to reduce the overall width of the implement 10.

Additionally, as shown in FIG. 1, the implement 10 may include inner-wing actuators 42 coupled between the central frame section 26 and the inner-wing sections 28, 30 to enable pivoting or folding between the fully-extended and transport positions. For example, by retracting/extending the inner-wing actuators 42, the inner-wing sections 28, 30 may be pivoted or folded relative to the central frame section 26 about the pivot joints 36. Moreover, the implement 10 may also include outer-wing actuators 44 coupled between each inner-wing section 28, 30 and its adjacent outer-wing section 32, 34. As such, by retracting/extending the outer-wing actuators 44, each outer-wing section 32, 34 may be pivoted or folded relative to its respective inner-wing section 28, 30.

Moreover, each of the frame sections may be configured to support a plurality of ground-engaging tools, such as one or more gangs of discs 50. In such an embodiment, the gangs of discs 50 may be supported relative to frame members 46, 48, 52, 54, 60, 62 of the frame sections in any suitable manner so as to provide smooth working of the soil. It should be appreciated that, in other embodiments, any other suitable ground-engaging tools, such as shanks, tines, rolling baskets, and/or the like, may also be supported by the various frame members.

In several embodiments, the various frame sections 26, 28, 30, 32, 34 of the implement 10 may be configured to be positioned at variable positions relative to the soil in order to adjust the levelness of the implement 10 and to set the position of the gangs of discs 50 above the soil, as well as to set the penetration depth of the discs 50. For example, in the illustrated embodiment, the implement 10 includes center transport wheels 68 pivotally interconnected with the carrier frames 22 so that they provide support to the forward and aft frame members 46 and 48 relative to the soil. Similarly, inner-wing transport wheels 70 may be interconnected with the frame elements 58 to support and variably position the inner-wing sections 28, 30 relative to the soil. In addition, outer-wing transport wheels 72 may be pivotally mounted on the frame members 66 to support and variably position the outer-wing sections 32, 34 relative to the soil.

In such an embodiment, wheel actuators may also be provided in operative association with the various wheels to adjust the relative positioning between the frame sections and the soil. For instance, center wheel actuators 74, 76 may be utilized to manipulate the center transport wheels 68 to establish the distance of the central frame section 26 relative to the soil while inner-wing wheel actuators 78, 82 may be used to variably position the inner-wing sections 28, 30 relative to the soil. Similarly, outer-wing wheel actuators 80, 84 may be used to variably position the outer-wing sections 32, 34 relative to the soil.

It should be appreciated that the implement 10 may also include gauge wheels 86, 88 on the outer-wing sections 32, 34 to orient the fore-to-aft angle of the implement 10 relative to the soil. In such an embodiment, gauge wheel actuators 90, 92 may be provided in operative association with the gauge wheels 86, 88 to allow the fore-to-aft angle of the implement 10 to be adjusted. As shown in FIG. 1, in one embodiment, the gauge wheels 86, 88 may correspond to the forward-most ground-engaging components of the implement 10.

In accordance with aspects of the present subject matter, the implement 10 may be configured to support one or more field profile sensors 118 that generate or provide data indicative of one or more profile parameters associated with an aft portion of the field disposed rearward of the implement 10 relative to the direction of travel 18 of the implement 10. In several embodiments, the profile parameters may correspond to parameters that are affected by the levelness of the implement 10 relative to the ground, which may, in turn, be used to determine or infer when the implement is out-of-level. In addition (or as an alternative thereto), the profile parameters may be indicative of other operating conditions beyond an out-of-level state, such as when the implement 10 is hopping or bouncing relative to the field. In one embodiment, the profile parameter(s) may correspond to an average height of the field surface behind the implement and/or a roll orientation of the field surface behind the implement. As will be described below, the roll orientation may be characterized by a roll angle of the field surface defined in the lateral direction L1 relative to a horizontal reference plane. The horizontal reference plane may, in one embodiment, be defined by the implement frame.

In several embodiments, the field profile sensor(s) 118 may be mounted to or supported on the implement 10, with the field profile sensor(s) 118 having a field of view 120 directed towards the field. Specifically, as shown in FIG. 1, the field profile sensor(s) 118 may be supported relative to the implement 10 (e.g., adjacent to the aft end 19 of the implement 10) such that the field of view 120 of the sensor 118 is directed towards an aft portion of the field disposed rearward of the implement 10 relative to the direction of travel 18 of the implement 10. As such, the field profile sensor(s) 118 may be configured to generate data indicative of the surface profile or contour of the portion of the field located behind or aft of the implement 10.

Additionally, in accordance with aspects of the present subject matter, the field of view 120 of the field profile sensor(s) 118 may be configured to extend laterally beyond a lateral width 11 of the implement 10 along one or both sides of the implement 10. For instance, as shown in FIG. 1, the field of view 120 of the field profile sensor(s) 118 includes a central FOV section 120A generally aligned with the implement 10 in the direction of travel 18, a first lateral FOV section 120B extending beyond a first lateral side of the implement 10, and a second lateral FOV section 120C extending beyond a second lateral side of the implement 10. As a result, the field profile sensor(s) 118 may be configured to generate data indicative of one or more profile parameters of not only the portion or "swath" of the field located directly behind the implement 10, but also of adjacent portions or "swaths" of the field. As will be described below, such an arrangement allows data associated with the relevant profile parameter(s) to be collected for both the current swath being processed or worked by the implement 10 and an adjacent swath, such as the previously worked swath located immediately adjacent to the current swath (i.e., the previously worked swath located immediately to the left or right of the implement). The monitored profile parameter(s) for the current swath may then be compared to the monitored profile parameter(s) for the adjacent swath to assess the operating performance of the agricultural implement 10, such as by determining a differential between the monitored profile parameter(s) for the adjacent swaths and by comparing the differential to a predetermined differential threshold to assess whether the agricultural implement is working the field as desired.

It should be appreciated that the field profile sensor(s) 118 may be configured as any suitable device that allows the sensor 118 to generate data indicative of one or more profile parameters of the portion of the field located aft of the implement 10. For instance, in one embodiment, the field profile sensor(s) 118 may correspond to one or more LIDAR devices configured to generate point-cloud data associated with the surface profile of the field behind the implement, which can be used to determine the relevant profile parameter(s). In another embodiment, the field profile sensor(s) may correspond to one or more cameras (e.g., a stereo or 3-D camera(s)) configured to generate image data associated with the surface profile of the field behind the implement, which can be used to determine the relevant profile parameter(s). In other embodiments, the field profile sensor(s) 118 may correspond to any other suitable device, such as a radar sensor(s), ultrasonic sensor(s), and/or the like. It should be appreciated that, in one embodiment, different types of field profile sensors may be supported on or relative to the implement 10, such as by including a combination of one or more LIDAR devices and one or more cameras.

It should also be appreciated that, while the implement 10 is shown as only including or being associated with one field profile sensor(s) 118, the implement 10 may include or be associated with any other suitable number of field profile sensors 118, such as two or more field profile sensors 118. For instance, in one embodiment, the implement 10 may include two field profile sensors 118, with one of such field profile sensors 118 having a field of view encompassing the first lateral FOV section 120B and a portion of the central FOV section 120A and the other field profile sensor 118 having a field of view encompassing the remainder of the central FOV section 120A and the second lateral FOV section 120C. In another embodiment, the implement 10 may include three field profile sensors 118, with a first of such field profile sensors 118 having a field of view encompassing the central FOV section 120A, a second of such of field profile sensors 118 having a field of view encompassing the first lateral FOV section 120B, and a third of such field profile sensors 118 having a field of view encompassing the second lateral FOV section 120C. Further, it should also be appreciated that the field profile sensor(s) 118 may be supported at any other suitable location on the implement 10 and/or the work vehicle 14 such that the field of view 120 of the sensor 118 is directed towards the aft portion of the field behind the implement 10.

Additionally, it should be appreciated that the configuration of the implement 10 described above and shown in FIG. 1 is provided only to place the present subject matter in an exemplary field of use. Thus, it should be appreciated that the present subject matter may be readily adaptable to any manner of implement configuration.

Figure 2:
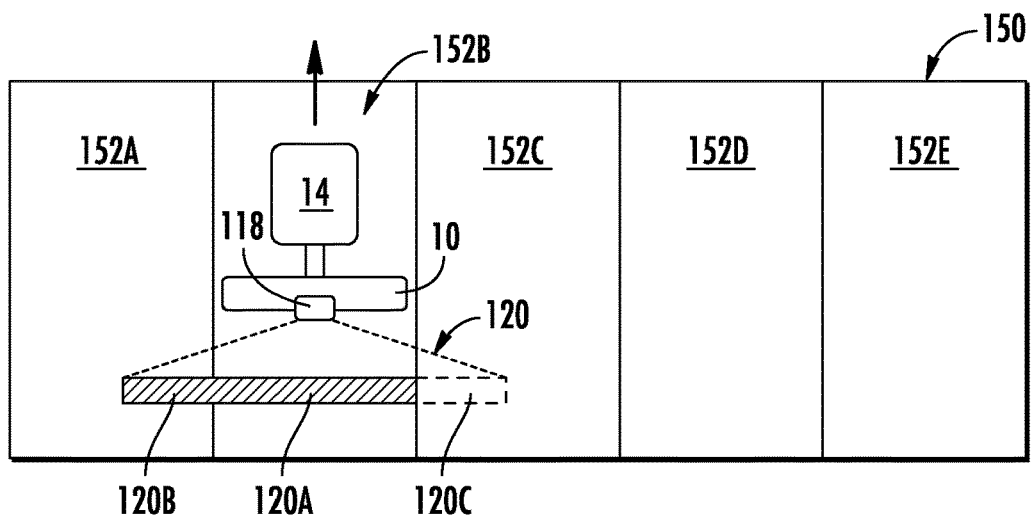
FIG. 2 illustrates a simplified, aerial view of a work vehicle and associated agricultural implement performing an agricultural operation within a field in accordance with aspects of the present subject matter, particularly illustrating field profile data being collected across adjacent swaths behind the implement during the agricultural operation.
Figure 3:
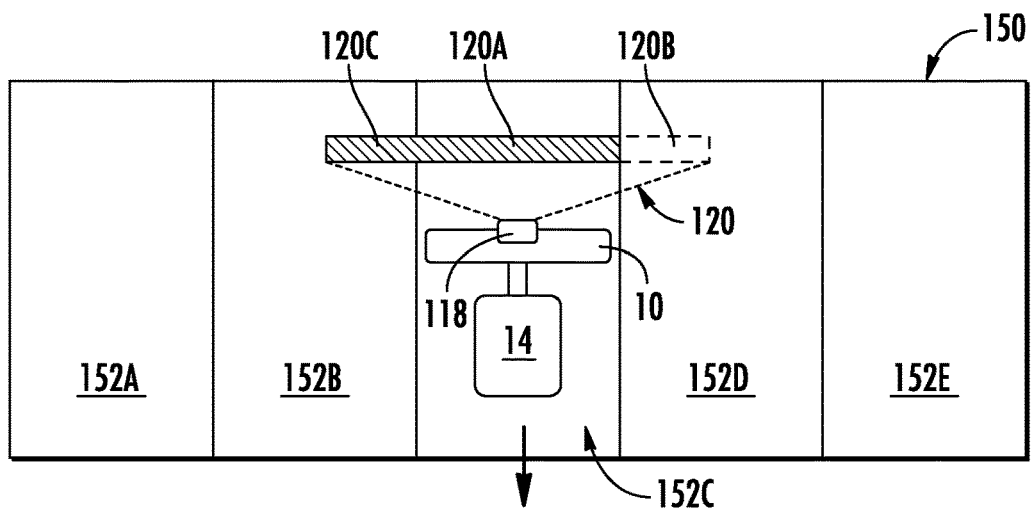
FIG. 3 illustrates another simplified, aerial view of the work vehicle and the tillage implement shown in FIG. 2, particularly illustrating the work vehicle making another pass across the field as field profile data of adjacent swaths of the field is being captured.
Figure 4:
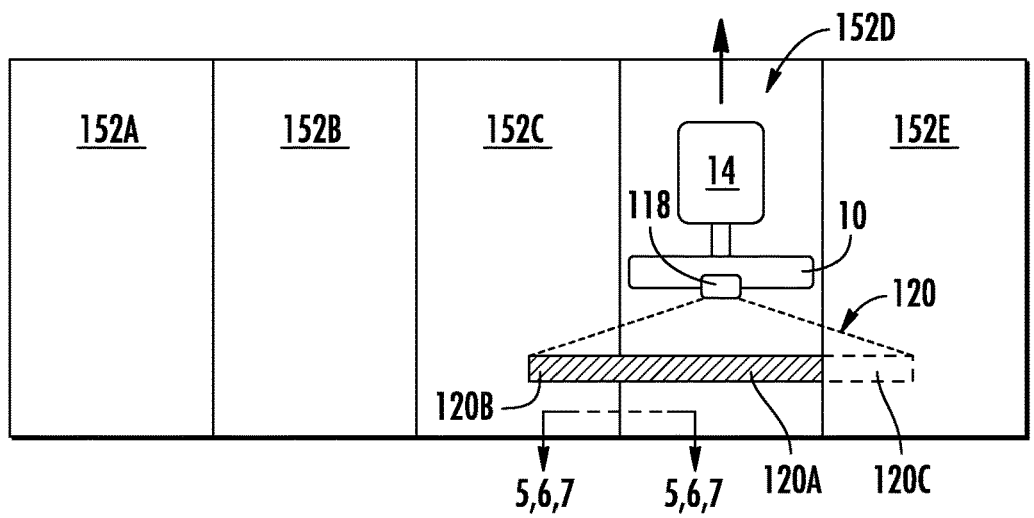
FIG. 4 illustrates yet another simplified, aerial view of the work vehicle and the tillage implement shown in FIG. 2, particularly illustrating the work vehicle making a further pass across the field as field profile data of adjacent swaths of the field is being captured.

Referring now to FIGS. 2-4, simplified, aerial views of an agricultural implement 10 being towed by a work vehicle 14 (e.g., an agricultural tractor) across a field 150 during the performance of an agricultural operation is illustrated in accordance with aspects of the present subject matter. As shown, the field 150 may be divided into a plurality of different field sections or "swaths" 152 generally defining the various different passes to be made by the implement/vehicle 10, 14 across the field 150 when performing the agricultural operation. For example, in the portion of the field 150 shown in FIGS. 2-4, five different field swaths 152 (e.g., a first field swath 152A, a second field swath 152B, a third field swath 152C, a fourth field swath 152D, and a fifth field swath 152E) are illustrated that correspond to five separate passes to be made by the implement/vehicle 10, 14 across the field 150.

As shown in the illustrated embodiment, a field profile sensor 118 is provided in association with the implement 10 that includes a field of view 120 spanning across all or portions of three adjacent swaths 152 of the field, such as the swath currently being worked by the implement 10 and the two adjacent swaths located along either lateral side of the implement 10. As such, the field profile sensor 118 may be configured to capture data indicative of one or more profile parameters associated with the swath currently being worked by the implement 10 as well as one or both of the adjacent swaths as the work vehicle 14 tows the implement 10 across the field 150 to make the various passes while performing the agricultural operation. Specifically, in accordance with aspects of the present subject matter, the field profile sensor 118 may be configured to capture data indicative of one or more profile parameters associated with both the swath currently being worked by the implement 10 as well as the previously worked swath to allow for a comparison between the profile parameters of such adjacent swaths.

For instance, as shown in FIG. 2, as the work vehicle 14 traverses across the second field swath 152B to allow such swath 152B to be worked by the implement 10, the field profile sensor 118 may be configured to capture data indicative of the profile parameters associated with both the second field swath 152B and the first field swath 152A (which, in this example, was previously worked by the implement 10 in the previous pass made across the field 150), such as by capturing data across highlighted FOV sections 120A and 120B. Following the tillage pass across the second field swath 150B, the work vehicle 14 may be turned around to make a subsequent pass across the adjacent, third field swath 150C to allow such portion of the field to be worked by the implement 10. As shown in FIG. 3, as the work vehicle 14 traverses across the third field swath 150C, the field profile sensor 118 may be configured to capture data indicative of the profile parameters associated with both the third field swath 152C and the previously worked second field swath 152B, such as by capturing data across highlighted FOV sections 120A and 120C. Such process may then be repeated as the work vehicle 14 makes subsequent passes across the field 150. For example, as shown in FIG. 4, as the work vehicle 14 traverses across the fourth field swath 152D to allow such portion of the field to be worked by the implement 10, the field profile sensor 118 may be configured to capture data indicative of the profile parameters associated with both the fourth field swath 152D and the previously worked third field swath 152C, such as by capturing data across highlighted FOV sections 120A and 120B.

It should be appreciated that, in embodiments in which the field profile sensor 118 has a field of view 120 spanning across three adjacent field swaths 152 in the manner shown in FIGS. 2-4, the side of the implement 10 on which the previously worked swath is located will change with each successive pass (assuming, of course, the implement 10 is making side-by-side pass across the field 150). As a result, in instances in which only the data associated with the current swath and previously worked swath is being analyzed, the data from the other adjacent swath (i.e., the un-worked swath) may be ignored or filtered out by recognizing which swath represents the previously worked swath (e.g., based on guidance data, GPS data, and/or the like). Alternatively, by recognizing which swath represents the previously worked swath, the field of view 120 may be narrowed during each pass to only capture data associated with the current swath and previously worked swath. Similarly, when two or more field profile sensors 118 are used, data received from the sensor 118 having a field of view directed towards the un-worked swath may be disregarded or such sensor may be deactivated during such pass and then reactivated during the subsequent pass along which the sensor 118 will have a field of view directed toward the previously worked swath.

Figure 5:
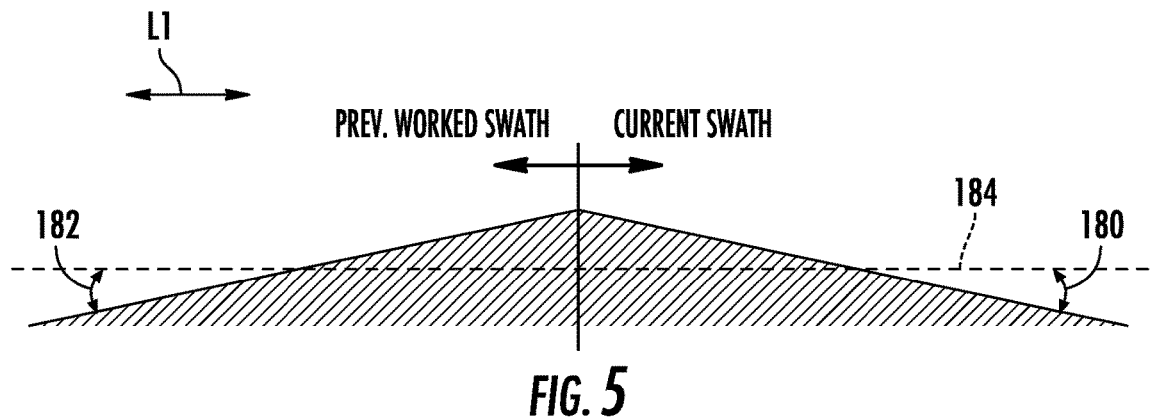
FIG. 5 illustrates a schematic view of an example field profile that may exist between adjacent swaths within a field in accordance with aspects of the present subject matter.
Figure 6:
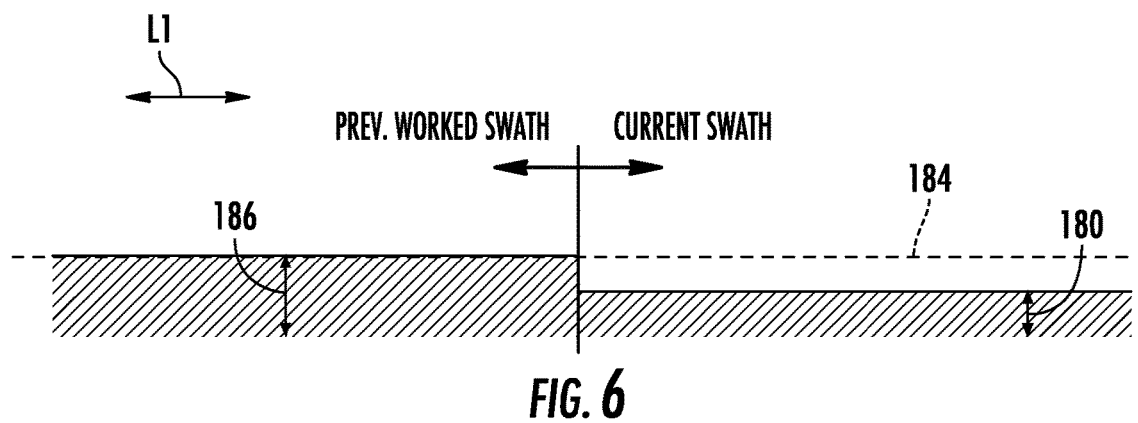
FIG. 6 illustrates a schematic view of another example field profile that may exist between adjacent swaths within a field in accordance with aspects of the present subject matter.
Figure 7:
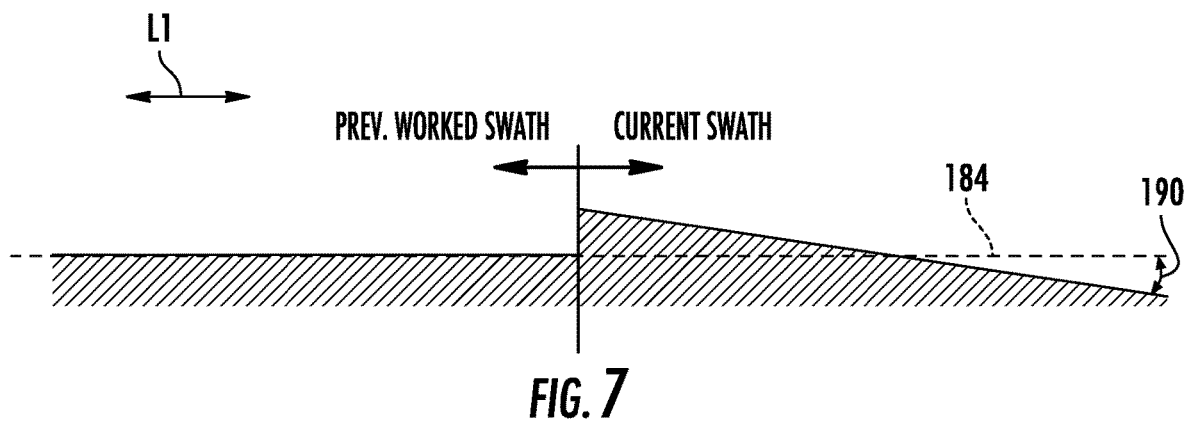
FIG. 7 illustrates a schematic view of a further example field profile that may exist between adjacent swaths within a field in accordance with aspects of the present subject matter.

Referring now to FIGS. 5-7, various exemplary field profiles that may be detected by the field profile sensor(s) 118 along the adjacent swaths being monitored are illustrated in accordance with aspects of the present subject matter. In particular, FIGS. 5-7 illustrate exemplary, partial sectional views of the current swath 152D and the previously worked swath 152C shown in FIG. 4 taken about line 5, 6, 7-5, 6, 7. However, in general, the exemplary views may be indicative of any section of the field spanning across a current swath being worked and the adjacent, previously worked swath.

As indicated above, field profile data generated by the field profile sensor(s) 118 may be indicative of one or more profile parameters associated with the aft portion of the field spanning across the adjacent swaths being monitored. In general, the profile parameter(s) may correspond to one or more parameters that are affected by the levelness of the implement 10 or one or more other operating states of the implement 10 (e.g., when the implement is bouncing or hopping relative to the field), such as an average height of the field surface behind the implement or a roll orientation of the field surface behind the implement. As a result, such parameter(s) may be used to determine or infer when the implement 10 is out-of-level or is otherwise not performing as desired.

As shown in the exemplary field profile of FIG. 5, both the current swath and the previously worked swath are oriented at a roll angle 180, 182 in the lateral direction L1 relative to a horizontal reference plane defined at an average height reference for the field (indicated by dashed line 184). Specifically, the current swath is oriented at a first roll angle 180 and the previously worked swath is oriented at a second roll angle 182. In the illustrated embodiment, the first and second roll angles 180, 182 are generally the same angle, but are oriented in opposite directions. Such a field profile along the adjacent swaths is generally indicative of the implement 10 being tilted at a given roll orientation as the implement 10 made both passes across the adjacent swaths. As a result, in one embodiment, it may be desirable to make an adjustment to level the implement, such as by adjusting the orientation of the frames of the implement to a more planar orientation.

As shown in the exemplary field profile of FIG. 6, while both the current swath and the previously worked swath are generally oriented horizontally in the lateral direction L1 (e.g., by having a roll angle substantially equal to zero), the adjacent swaths define different average heights relative to a horizontal reference plane defined at an average height reference for the field (indicated by dashed line 184). Specifically, while the previously worked swath defines an average height 186 that is generally equal to the average height reference 184, the current swath defines an average height 188 that is less than the average height reference 184. Such a field profile along the adjacent swaths may be indicative of the implement 10 bouncing or hopping during the current pass across the field or it may be indicative of an incorrect adjustment to one or more implement settings that occurred between such locations in the field. As a result, in one embodiment, it may be desirable to make an adjustment to ensure that the implement 10 works the soil in a manner that generates a level field across the two swaths, such as by adjusting the penetration depth of the discs.

As shown in the exemplary field profile of FIG. 7, both the current swath and the previously worked swath generally define the same average height relative to a horizontal reference plane indicating an average height reference for the field (indicated by dashed line 184). However, while the previously worked swath is generally oriented horizontally in the lateral direction L1 (e.g., by having a roll angle substantially equal to zero), the current swath is oriented at a roll angle 190 relative to the horizontal reference plane 184. Such a field profile along the adjacent swaths is generally indicative of a change in the roll orientation of the implement 10 occurring between the two adjacent passes. As a result, in one embodiment, it may be desirable to make an adjustment to level the implement, such as by adjusting the orientation of the frames of the implement to a more planar orientation.

It should be appreciated that, for purposes of the discussion above with references to FIGS. 5-7, it was generally assumed that the desired performance of the implement 10 is to create a field profile having a horizontal orientation and defining a uniform average height across the field. However, in certain instances, an operator may desire to work the field in a manner that creates adjacent swaths having different average heights and/or different roll orientations. Thus, in general, the disclosed system and method may be used to detect when the field profile across adjacent swaths deviates from a desired profile and to subsequently make adjustments, as necessary, to ensure that the actual field profile matches the desired profile as closely as possible (regardless of whether the desired profile is a flat, level profile or a profile having different average heights and/or roll orientations).

Figure 8:
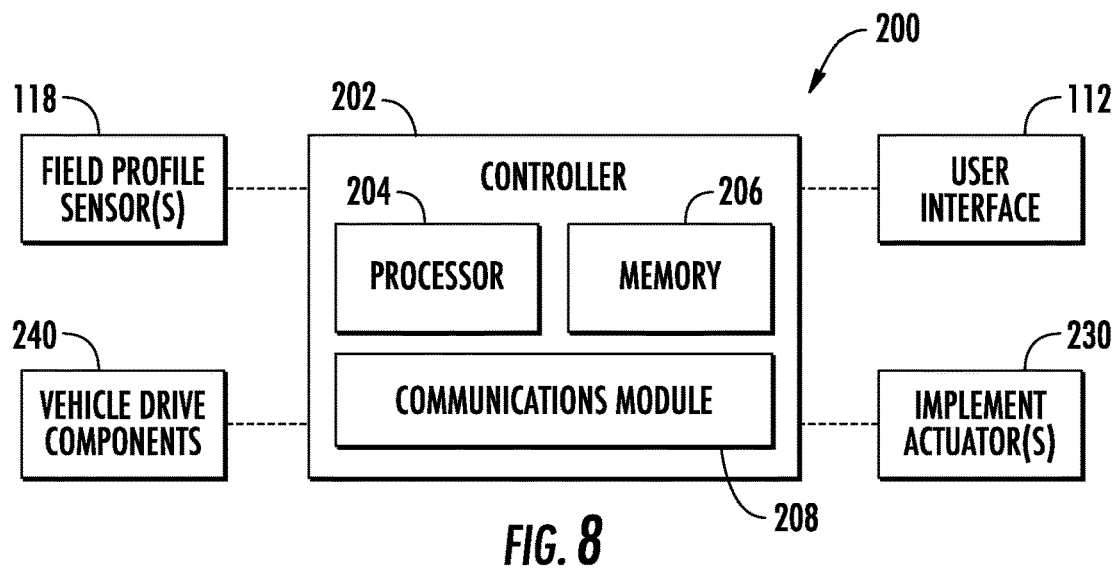
FIG. 8 illustrates a schematic view of one embodiment of a system for monitoring the operating performance of agricultural implements in accordance with aspects of the present subject matter.

Referring now to FIG. 8, a schematic view of one embodiment of a system 200 for monitoring the performance of an agricultural implement is illustrated in accordance with aspects of the present subject matter. For purposes of discussion, the system 200 will be described herein with reference to the implement 10 described above and shown in FIG. 1. However, it should be appreciated that the disclosed system 200 may generally be utilized with any suitable implement having any suitable implement configuration. Additionally, it should be appreciated that communicative links or electrical couplings of the system 200 shown in FIG. 8 are indicated by dashed lines.

As shown, the system 200 includes a controller 202 configured to electronically control the operation of one or more components of the agricultural implement 10 and/or the associated work vehicle 14 configured to tow the agricultural implement. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle 14 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 (and/or the associated work vehicle 14) to allow for the disclosed system and method to be implemented without requiring additional software to be uploaded onto existing control devices of the agricultural implement 10.

In some embodiments, the controller 202 may include a communications module or interface 208 to allow for the controller 202 to communicate with any of the various other system components described herein. For instance, as described above, the controller 202 may, in several embodiments, be configured to receive data from one or more sensors of the agricultural implement 10 that is used to determine one or more profile parameters associated with an aft portion of the field located rearward of the implement 10. Particularly, the controller 202 may be in communication with one or more field profile sensors 118 configured to generate data associated with one or more profile parameters of the field at a location aft of the implement 10, which can be used to determine or infer the operating performance of the implement 10. In one embodiment, the controller 202 may be communicatively coupled to the surface profile sensor(s) 118 via any suitable connection, such as a wired or wireless connection, to allow data to be transmitted from the sensor(s) 118 to the controller 202.

As indicated above, the field profile sensor(s) 118 may be installed or otherwise supported relative to the implement 10 to capture data (e.g., point-cloud data, image data, and/or the like) associated with the profile of an aft portion of the field (e.g., the average height and/or roll orientation of the aft portion of the field), which, in turn, be used to assess the operating performance of the implement 10, such as by using the data to assess the levelness of the implement 10 or to identify other operating states of the implement 10 (e.g., bouncing or hopping). Thus, in several embodiments, the controller 202 may be configured to monitor the operating performance of the implement 10 based on the data received from the sensor(s) 118. For example, the controller 202 may be configured to analyze/process the received data to compare the field profile detected across the swath currently being worked to the field profile detected across the adjacent, previously worked swath, such as by comparing one or more profile parameters for the adjacent swaths to each other. In one embodiment, such comparison between the profile parameters of the adjacent swaths may take the form of the calculation of a differential between the profile parameter(s) for the swath being currently worked and the corresponding profile parameter(s) for the adjacent, previously worked swath. In such an embodiment, the calculated differential may then be compared to a predetermined differential threshold set for the associated profile parameter(s) to assess the operating performance of the implement 10.

As indicated above, in one embodiment, the data collected by the field profile sensor(s) 118 may be used to determine an average height of the field surface across both the swath currently being worked and the adjacent, previously worked swath. In such an embodiment, the average heights for the adjacent swaths may be compared to assess the operating performance of the implement 10. For instance, in one embodiment, the controller 202 may be configured to determine a differential between the average heights for the adjacent swaths, such as by subtracting the average height for the swath currently being worked from the average height of the adjacent, previously worked swath or vice versa. The calculated height differential may then be compared to a predetermined height differential threshold stored within the controller's memory 206 to assess the operating performance of the implement 10. For example, in one embodiment, it may be determined that the implement 10 is not working the soil as desired and that an adjustment in one or more operating parameters of the implement (or the associated work vehicle) should be made when the calculated height differential exceeds the predetermined height differential threshold stored within the controller's memory 206.

Additionally, in one embodiment, the data collected by the field profile sensor(s) 118 may be used to determine a roll orientation (e.g., a roll angle) of the field surface across both the swath currently being worked and the adjacent, previously worked swath. In such an embodiment, the roll orientations for the adjacent swaths may be compared to assess the operating performance of the implement 10. For instance, in one embodiment, the controller 202 may be configured to determine a differential between the roll orientations for the adjacent swaths, such as by subtracting the roll angle for the swath currently being worked from the roll angle of the adjacent, previously worked swath or vice versa. The calculated orientation differential may then be compared to a predetermined orientation differential threshold stored within the controller's memory 206 to assess the operating performance of the implement 10. For example, in one embodiment, it may be determined that the implement 10 is not working the soil as desired and that an adjustment in one or more operating parameters of the implement (or the associated work vehicle) should be made when the calculated orientation differential exceeds the predetermined height differential threshold stored within the controller's memory 206.

The controller 202 may also be configured to perform one or more control actions based on the determination of the operating performance of the implement 10. In several embodiments, the control action may correspond to the generation of an operator notification to allow the controller 202 indicate to an operator the status of the implement's performance. For example, in the embodiment shown in FIG. 8, the communications module 208 may allow the controller 202 to communicate with a user interface 212 having a display device, with the display device being configured to display information associated with the operating performance of the implement 10. However, it should be appreciated that the controller 202 may instead be coupled to any number of other indicators, such as lights, alarms and/or the like to provide an indication of the operating performance of the implement 10.

In further embodiments, the controller 202 may be configured to perform one or more implement-related control actions based on the determination of the operating performance of the implement 10. Specifically, in some embodiments, the controller 202 may be configured to control one or more components of the agricultural implement 10 based on the determination that the implement 10 is not performing as desired, such as when the monitored profile parameter(s) indicate that the field profile of the aft portion of the field located rearward of the implement 10 does not match the desired field profile (e.g., the average height is too high or too low or the orientation of the profile is not horizontal in the lateral direction L1). For example, as shown in FIG. 8, the controller 202 may be configured to control one or more implement actuators 230 (e.g., actuators 42, 44, 74, 76, 78, 80, 82, 84, 90, 92 of implement 10) to adjust the positioning of the implement frame relative to the ground or to adjust the position of a portion(s) of the frame relative to another portion(s) of the frame. Such control of the operation of the implement actuators 230 may, for example, be used to adjust levelness of the implement 10. For instance, if the monitored profile parameter(s) indicate that the implement is out-of-level, the controller 202 may be configured to control the operation of one or more of the wing actuators 42, 44 to adjust the relative positioning of one or more of the frame sections 26, 28, 30, 32, 34 and, thus, correct the levelness of the implement 10.

Additionally or alternatively, in some embodiments, the controller 202 may be configured to perform one or more vehicle-related control actions based on the determination of the operating performance of the implement 10. For example, as shown in FIG. 8, in some embodiments, the controller 202 may be configured to control the operation of one or more vehicle drive components 240 configured to drive the work vehicle 14 coupled to the implement 10, such as the engine 15A and/or the transmission 15B of the work vehicle 14. In such embodiments, the controller 202 may be configured to control the operation of the vehicle drive component(s) 240 based on the determination of the operating performance of the implement 10, for example, to bring the work vehicle 14 and implement 10 to a stop when it is determined that the implement 10 is not performing as desired.

It should be appreciated that, depending on the type of controller 202 being used, the above-described control actions may be executed directly by the controller 202 or indirectly via communications with a separate controller. For instance, when the controller 202 corresponds to an implement controller of the implement 10, the controller 202 may be configured to execute the implement-related control actions directly while being configured to execute the vehicle-related control actions by transmitting suitable instructions or requests to a vehicle-based controller of the work vehicle towing the implement 10 (e.g., using an ISObus communications protocol). Similarly, when the controller 202 corresponds to a vehicle controller of the vehicle towing the implement 10, the controller 202 may be configured to execute the vehicle-related control actions directly while being configured to execute the implement-related control actions by transmitting suitable instructions or requests to an implement-based controller of the implement 10 (e.g., using an ISObus communications protocol). In other embodiments, the controller 202 may be configured to execute both the implement-based control actions and the vehicle-based control actions directly or the controller 202 may be configured to execute both of such control action types indirectly via communications with a separate controller.

Figure 9:
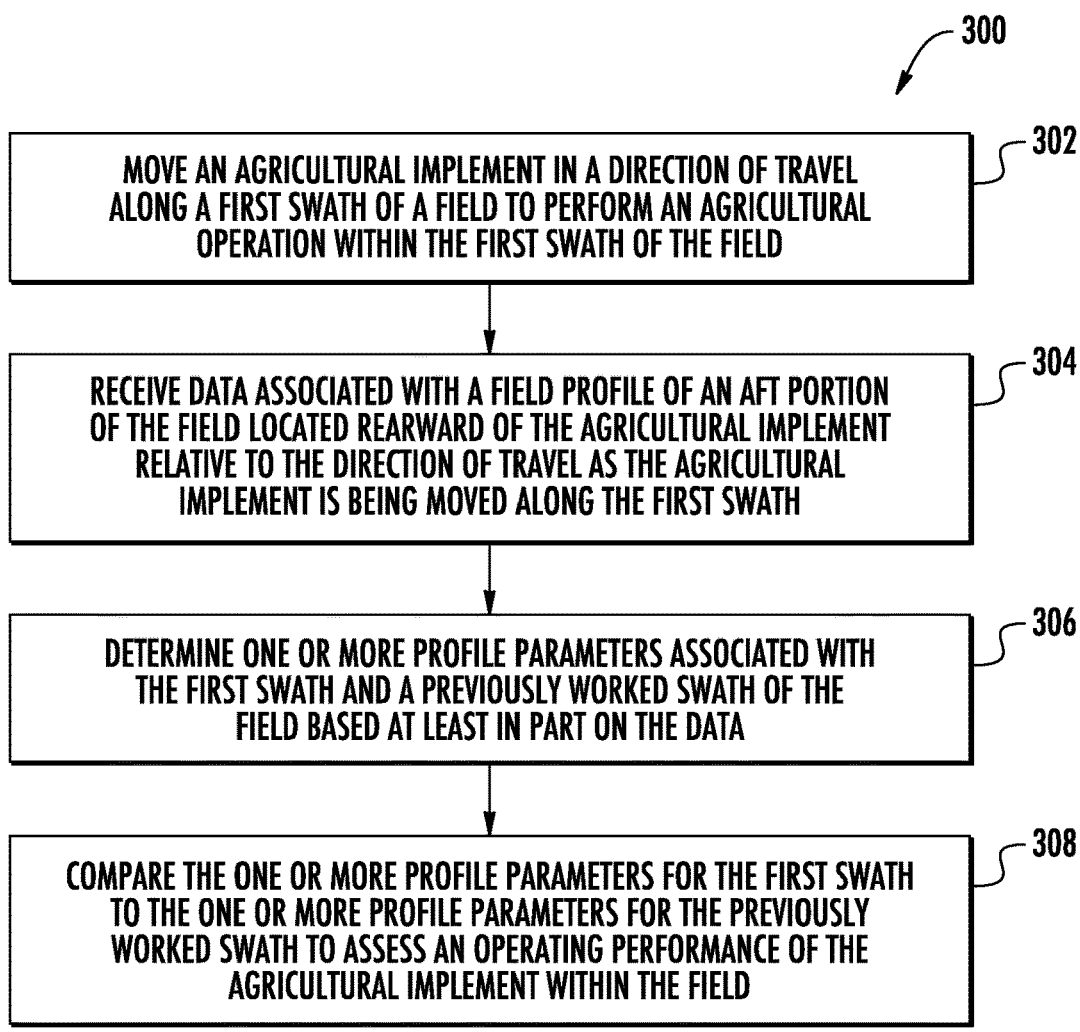
FIG. 9 illustrates a flow diagram of one embodiment of a method for monitoring the operating performance of agricultural implements in accordance with aspects of the present subject matter.

Referring now to FIG. 9, a flow diagram of one embodiment of a method 300 for monitoring the operating performance of agricultural implements is illustrated in accordance with aspects of the present subject matter. In general, the method 300 will be described herein with reference to the implement 10 shown in FIG. 1 and the system 200 shown in FIG. 8. However, it should be appreciated that the disclosed method 300 may be executed with implements having any other suitable configurations and/or with systems having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 9, at (302), the method 300 may include moving an agricultural implement in a direction of travel along a first swath of a field to perform an agricultural operation within the first swath of the field. For instance, as indicated above the implement 10 may be towed across a field via a work vehicle 14 to allow an agricultural operation (e.g., a tillage operation) to be performed as the implement/vehicle 10, 14 make passes across the field.

Additionally, at (304), the method 300 may include receiving data associated with a field profile of an aft portion of the field located rearward of the agricultural implement relative to the direction of travel as the agricultural implement is being moved along the first swath. For instance, as indicated above, the controller 202 may receive data indicative of a field profile of the aft portion of the field rearward of the agricultural implement 10 relative to a direction of travel 18 of the implement 10, such as by receiving such data from an associated field profile sensor(s) 118. In such instances, the aft portion of the field may encompass not only all or a portion of the swath currently being worked by the implement 10, but also all or a portion of the adjacent, previously worked swath. For instance, as described above, the field profile sensor(s) 118 may include a field of view 120 that extends across two or more adjacent swaths within the field.

Moreover, at (306), the method 300 may include determining one or more profile parameters associated with the first swath and a second swath of the field based at least in part on the data. For instance, as indicated above, the controller 202 may be configured to determine one or more profile parameters associated with the aft portion of the field based on the data received from the field profile sensor(s) 118, such as by determining an average height and/or a roll orientation for the swath currently being worked by the implement 10 and an adjacent, previously worked swath.

Referring still to FIG. 9, at (308), the method 300 may include comparing the one or more profile parameters for the first swath to the one or more profile parameters for the second swath to assess an operating performance of the agricultural implement within the field. For example, as described above, the controller 202 may be configured to compare the monitored profile parameter(s) for the adjacent swaths to assess the performance of the implement 10, such as to determine when the implement 10 is out-of-level or is not otherwise performing as desired. In one embodiment, the controller may calculate a differential between monitored profile parameter(s) for the adjacent swaths, which may then be compared to a predetermined differential threshold to assess the operating performance of the implement 10.

The method also include any other suitable steps or method elements, including initiating a control action based on the determined operating performance of the implement 10. For instance, as indicated above, in some embodiments, the controller 202 may provide an indication of the operating performance to the operator, such as by controlling the operation of the user interface 212 to display information providing an operator notification related to the operating performance of the implement 10. In addition to such operator notifications or as an alternative thereto, the controller 202 may be configured to execute one or more implement-based or vehicle-based control actions, such as by controlling the operation of one or more actuators 230 of the implement 10 to adjust the positioning of the frame relative to the ground (or the positioning of a portion(s) of the frame relative to another portion(s) of the frame) or by bringing the implement 10 to a stop by controlling the operation of the associated work vehicle 14.

It is to be understood that the steps of the method 300 may be performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, may be implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring operating performance of agricultural implements, the method comprising:
   moving an agricultural implement in a direction of travel along a first swath of a field to perform an agricultural operation within the first swath of the field;
   receiving, with a computing device, data associated with a field profile of an aft portion of the field located rearward of the agricultural implement relative to the direction of travel as the agricultural implement is being moved along the first swath, the aft portion comprising both the first swath and a second swath of the field located adjacent the first swath within the field;
   determining, with the computing device, one or more profile parameters associated with the first swath and the second swath based at least in part on the data; and
   comparing, with the computing device, the one or more profile parameters for the first swath to the one or more profile parameters for the second swath to assess an operating performance of the agricultural implement within the field.

2. The method of claim 1, wherein receiving the data comprises receiving the data from at least one field profile sensor supported relative to the agricultural implement.

3. The method of claim 1, wherein determining the one or more profile parameters comprises determining an average height of the first swath and an average height of the second swath.

4. The method of claim 3, wherein comparing the one or more profile parameters for the first swath to the one or more profile parameters for the second swath comprises:
   determining a height differential between the average height of the first swath and the average height of the second swath; and
   comparing the height differential to a predetermined differential threshold to assess the operating performance of the agricultural implement within the field.

5. The method of claim 1, wherein determining the one or more profile parameters comprises determining a roll orientation of the first swath and a roll orientation of the second swath.

6. The method of claim 5, wherein comparing the one or more profile parameters for the first swath to the one or more profile parameters for the second swath comprises:
   determining an orientation differential between the roll orientation of the first swath and the roll orientation of the second swath; and
   comparing the orientation differential to a predetermined differential threshold to assess the operating performance of the agricultural implement within the field.

7. The method of claim 1, further comprising initiating a control action based at least in part on the assessment of the operating performance of the agricultural implement within the field.

8. The method of claim 7, wherein comparing the one or more profile parameters for the first swath to the one or more profile parameters for the second swath comprises determining that the agricultural implement is out-of-level based on the comparison; and
   wherein initiating the control action comprises initiating a control action to adjust a levelness of the agricultural implement in response to the determination that the agricultural implement is out-of-level.

9. The method of claim 7, wherein initiating the control action comprises generating an operator notification associated with the operating performance of the agricultural implement.

10. The method of claim 7, wherein initiating the control action comprises adjusting an operation of at least one of the agricultural implement or a work vehicle towing the agricultural implement across the field.

11. A system for monitoring operating performance of agricultural implements, the system comprising:
    an agricultural implement including a plurality of ground-engaging tools;

at least one field profile sensor supported relative to the agricultural implement, the at least one field profile sensor being configured to generate data associated with a field profile of an aft portion of a field located rearward of the agricultural implement relative to a direction of travel of the agricultural implement;

a controller communicatively coupled to the field profile sensor, the controller being configured to:

receive the data from the at least one field profile sensor associated with the field profile of the aft portion of the field as the agricultural implement is being moved along a first swath of the field during performance of an agricultural operation, the aft portion comprising both the first swath and a second swath of the field located adjacent the first swath within the field;

determining one or more profile parameters associated with the first swath and the second swath based at least in part on the data; and comparing the one or more profile parameters for the first swath to the one or more profile parameters for the second swath to assess an operating performance of the agricultural implement within the field.

12. The system of claim 11, wherein the at least one field profile sensor comprises at least one of one or more LIDAR devices, one or more cameras, one or more radar sensors, or one or more ultrasound sensors.

13. The system of claim 11, wherein the one or more profile parameters comprises an average height of the first swath and an average height of the second swath.

14. The system of claim 13, wherein the controller is configured to determine a height differential between the average height of the first swath and the average height of the second swath, and compare the height differential to a predetermined differential threshold to assess the operating performance of the agricultural implement within the field.

15. The system of claim 11, wherein the one or more profile parameters comprises a roll orientation of the first swath and a roll orientation of the second swath.

16. The system of claim 15, wherein the controller is configured to determine an orientation differential between the roll orientation of the first swath and the roll orientation of the second swath, and compare the orientation differential to a predetermined differential threshold to assess the operating performance of the agricultural implement within the field.

17. The system of claim 11, wherein the controller is further configured to initiate a control action based at least in part on the assessment of the operating performance of the agricultural implement within the field.

18. The system of claim 17, wherein the controller is configured to determine that the agricultural implement is out-of-level based on the comparison between the one or more profile parameters for the first swath and the one or more profile parameters for the second swath, the control action being associated with adjusting a levelness of the agricultural implement in response to the determination that the agricultural implement is out-of-level.

19. The system of claim 17, wherein the control action comprises generating an operator notification associated with the operating performance of the agricultural implement.

20. The system of claim 17, wherein the control action comprises adjusting an operation of at least one of the agricultural implement or a work vehicle towing the agricultural implement across the field.

* * * * *